April 8, 1958
E. WERNER
2,829,932
SHAFT BUSHING AND LUBRICATING MEANS THEREFOR
Filed June 4, 1954
3 Sheets-Sheet 1
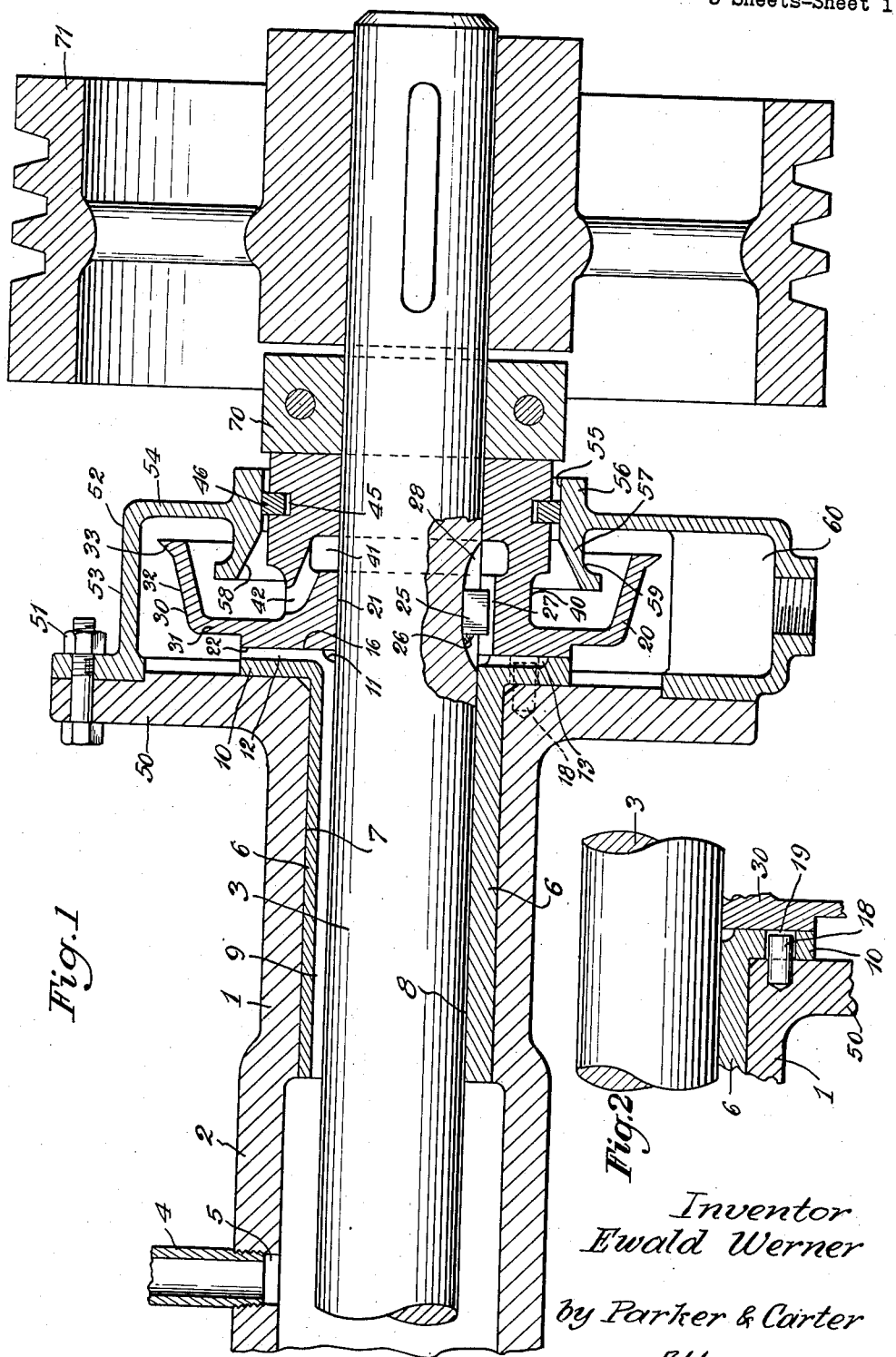
Inventor
Ewald Werner
by Parker & Carter
Attorneys April 8, 1958     E. WERNER     2,829,932
SHAFT BUSHING AND LUBRICATING MEANS THEREFOR
Filed June 4, 1954     3 Sheets-Sheet 2
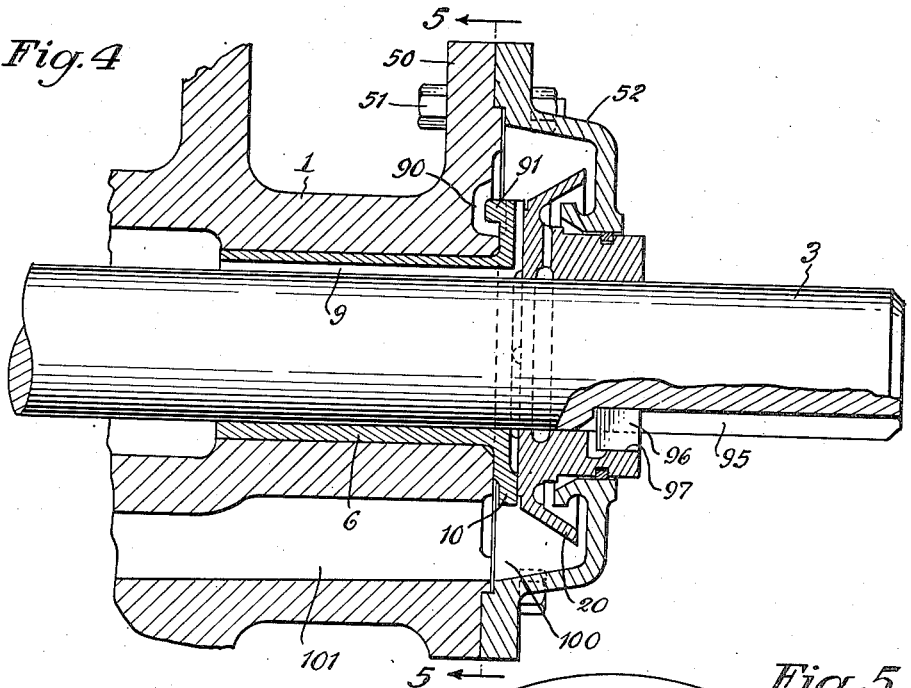
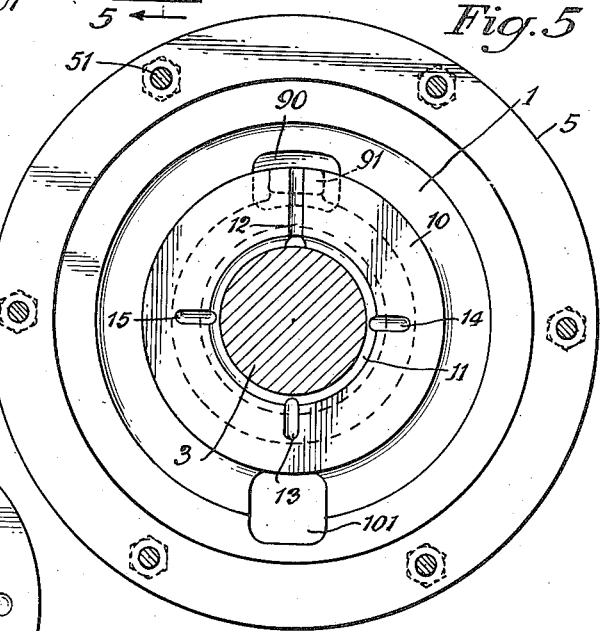
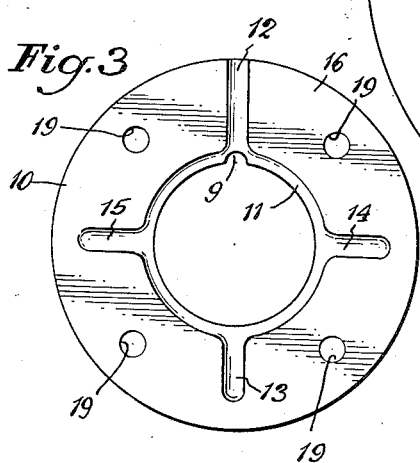
Inventor,
Ewald Werner
by Parker & Carter
Attorneys

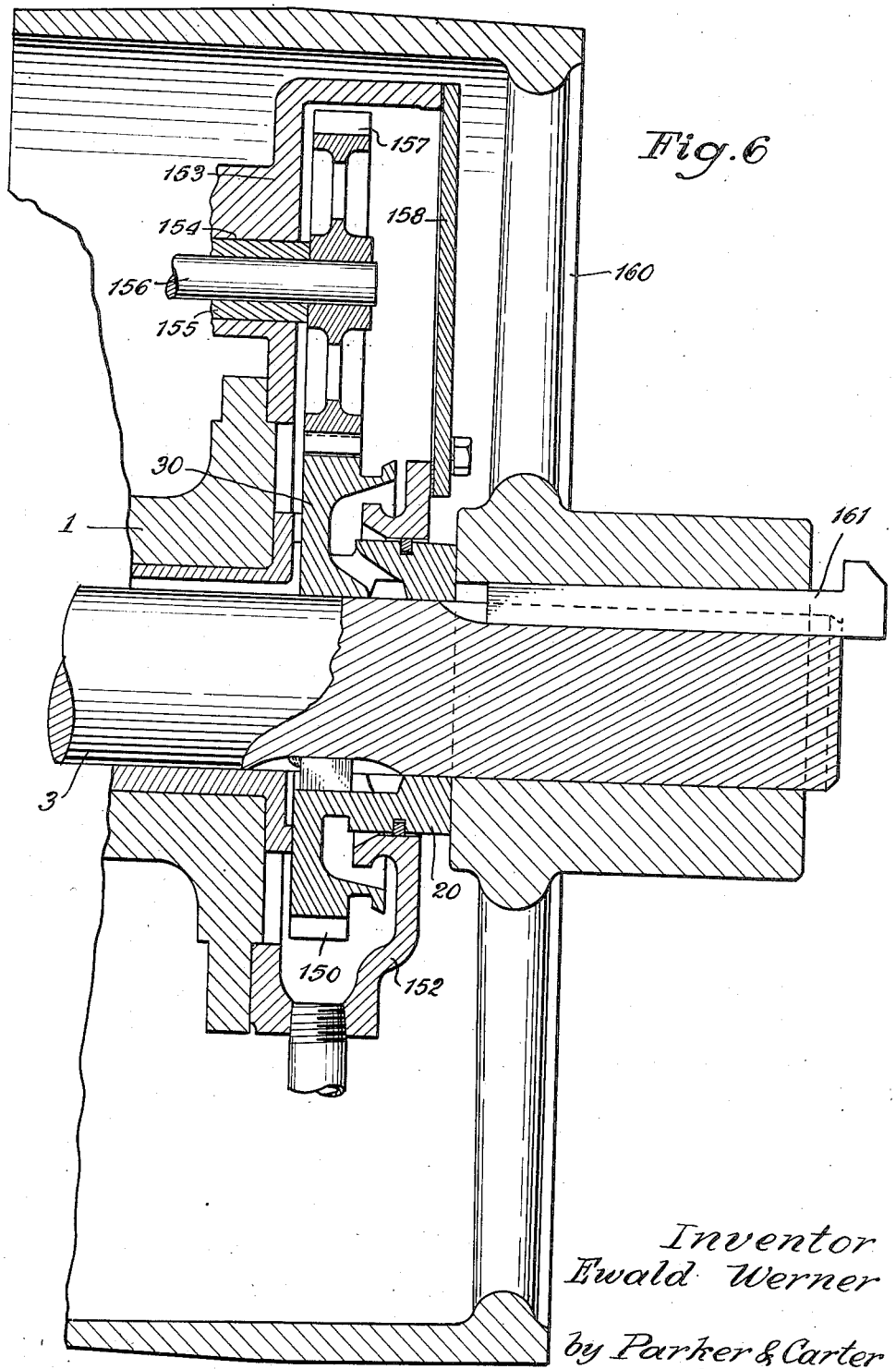

United States Patent Office 2,829,932
Patented Apr. 8, 1958

2,829,932

SHAFT BUSHING AND LUBRICATING MEANS THEREFOR

Ewald Werner, Milwaukee, Wis., assignor to Nordberg Manufacturing Company, Milwaukee, Wis., a corporation of Wisconsin Application June 4, 1954, Serial No. 434,456

17 Claims. (Cl. 308—36.4)

My invention relates to shaft bushings and lubricating and sealing means therefor and has particular relation to employment of such mechanism with the counter shaft of stone or ore crushers and the like.

One object of my invention is to provide a countershaft housing and bushing therefor which shall be effective to permit the countershaft to wedge oil supplied to the bushing between the shaft and the bushing as the shaft rotates.

Another object is to provide a countershaft bushing and oil slinger means which is rotatable with the countershaft and which may be positioned to carry oil outwardly away from the bushing.

Another purpose is to provide a sealing means for a countershaft bushing which shall be effective to seal the shaft and bushing against the entry of dust and the like.

Another purpose is to provide oiling and sealing means for a countershaft which shall be effective to seal the shaft against the exit of oil and also against the entry of dust.

Another purpose is to provide a lubricating and sealing means for a countershaft which may be easily and simply assembled thereon.

Other purposes will appear from time to time in the course of the specification and claims.

I illustrate my invention more or less diagrammatically in the accompanying drawings wherein Fig. 1 is a side elevation in partial cross section;

Fig. 2 is a detail view, in partial cross section, illustrating a means of positioning a bushing in a housing therefor;

Fig. 3 is an end view illustrating the outer face of the bushing illustrated in Fig. 1;

Fig. 4 is a partial side elevation, in cross section and on a reduced scale, of a modified form of my invention;

Fig. 5 is a view taken on line 5—5 of Fig. 4;

Fig. 6 is a side elevation, in partial cross section and on a reduced scale, illustrating a variant form of my invention.

Like parts are indicated by like symbols throughout the specification and drawings.

Referring now to the drawings and particularly to Fig. 1, the countershaft housing is generally indicated at 1. The housing 1 may have a generally centrally located box or outwardly offset portion 2, having an inside diameter substantially larger than the inside diameter of a countershaft 3, which extends longitudinally through the housing 1. 4 indicates an oil supply pipe threaded into an aperture 5 in the wall of the housing 1 and adapted to supply oil under pressure to the countershaft box 2. 6 indicates a bushing fitted into the central bore 7 of the housing 1. The bushing 6 has an internal bearing surface 8 for the countershaft 3. The bearing surface 8 has a longitudinal groove 9 extending the full length thereof and located, as the parts are shown on the drawings, along the top of the surface 8. The outer surface of the bearing 6 may, for example, be a press fit in the bore 7 of the housing 1. The bearing 6 has an outer annular face 10, which may be generally circular. An arcuate annular groove 11 may be cut into the face 10 and may surround the shaft 3, as illustrated in Figures 1 and 3. A radial groove 12 may be cut into the outer face of the flange 10 and may stem from the outer edge thereof inwardly to the groove 11 and thus to the shaft 3. A number of similar radial grooves 13, 14 and 15 may be circumferentially spaced around the outer face 16 of the flange 10. As best seen in Fig. 3, the grooves 13, 14 and 15 need not extend all the way to the perimeter of the plate or flange 16. As seen also in Fig. 3, the grooves 12, 13 and 15 each communicates with the circular groove 11 surrounding the bore of the bushing 6.

A key or pin 18 secures or positions the bearing face 10 in place on the housing 1. An aperture into which the key 18 fits is shown at 19.

An oil slinger ring is indicated generally at 20 and may have a central bore 21 adapted for close fit on the shaft 3. The slinger ring 20 may have an inner generally circular face 22 adapted to seat against the outer face 16 of the bearing flange 10 and to function as a thrust bearing thereagainst. The ring 20 may be keyed to the shaft 3 as by the key 25. The key 25 may be secured to the shaft 3 as by the weld 26 and may extend into an elongated groove 27 in the slinger ring 20. The shaft 3 may have an elongated cut out portion 28 into which the key 25 may be inserted and against the inner face of which the key 25 may be welded as by the weld 26, as shown in Fig. 1.

The ring 20 may have an outwardly extending annular oil slinger portion 30. The slinger portion 30 may comprise a generally radially extending portion 31, an angularly disposed skirt portion 32 and a second angular outwardly disposed end portion 33. The outer circumferential face of the ring 20 may also have an inwardly directed annular groove or recess 40 in lateral alignment with the slinger portion 30. The inner bore 21 of the ring 20 may have an annular groove 41 therein. A passage 42 connects the grooves 41 and 40. The slinger ring 20 has a second annular groove or recess 45 in its other circumferential face adjacent its outer end. The groove 45 receives an expanding type piston ring 46.

The countershaft housing 1 has an outwardly directed annular flange 50 at its outer end. Secured to the outer face of the flange 50 as by the threaded securing means 51 is a housing 52. The housing 52 may have a circumferential wall 53 and a generally vertical wall 54 of sufficient extension to surround the slinger ring 30. The wall 54 has a central bore 55, having an inner diameter greater than the outer diameter of the ring 20. A longitudinally outwardly extending flange 56 surrounds the bore 55 and has an inwardly extending portion 57. The portion 57 has an inner circumferential face 58 which is itself outwardly conical. It will be seen that the outer circumferential surface of the inwardly extending annular flange portion 57 is grooved or recessed as at 59. As best seen in Figures 1, 4 and 6, the portion 57 extends inwardly a distance sufficient to be surrounded by the slinger ring skirt portion 32. The housing 52 has a drain means 60 at the bottom portion thereof. 70 indicates generally a positioning ring or sleeve on the shaft 3 and 71 generally indicates a pulley member secured to the other end of the shaft 3.

In the modified form of my invention illustrated in Fig. 4, I illustrate an alternate means for positioning the flange 10 of the bushing 6 in the housing 1. The outer face of the housing 1 may be cut out or recessed as indicated at 90. The cut-out portion 90 may be generally rectangular in shape. A key 91 may be formed on the inner face of the bearing flange 10 and may be integral therewith. As best seen in Fig. 5, the groove or cut-out portion 90 in the outer face of the housing 1 is of substantially greater width than the key 91. Fig. 4 also illustrates an alternate means of keying the shaft 3 to the slinger ring 20. The shaft 3 may have a slot 95 into which a key 96 is fitted. The outer face of the ring 20 may be inwardly grooved as at 97 to permit the entry therein of the key 96. As indicated generally at 100, the housing 52 may drain directly back into an oil drain passage 101 which may comprise a bore in the lower portion of the housing 1.

In the modified form of my device illustrated in Fig. 6, the structure is essentially that of Fig. 1, with the exception that the slinger ring 30 may have a geared or toothed outer circumferential surface, indicated generally at 150. The housing 152 is secured to the shaft housing 1. The lower portion of the housing 152 is formed in a manner similar to that of the housing 52 illustrated in Fig. 1. The upper portion of the housing 152 is substantially extended to include an inner face 153, which may have a bore 154 in which a bushing 155 is fitted. A shaft 156 extends through the bushing 155 into the housing 152 and has secured thereon for rotation therewith a gear 157, the teeth of which are in mesh with the teeth 150 of the slinger ring. A plate 158 closes an opening in the outer face of the housing 152. A pulley 160 is secured to the shaft 3 as by the key 161. As shown in Fig. 6, the pulley 160 may be sufficient in size to enclose the entire housing 152.

Whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my specific disclosure.

The use and operation of my device are as follows:

Oil is fed under pressure to the countershaft housing box portion 2 through the feed pipe 4. The oil is thereafter forced through the internal groove 9 in the bushing 6 and is wedged therefrom by the rotation of the shaft 3 throughout the inner surface 8 of the bushing 6. It will be realized that the oil fed under pressure to the countershaft box 2 may be utilized in lubrication of a bearing at the opposite end of the shaft, not shown. A radial groove 12 permits the escape of oil from the groove 9 outwardly from the bushing. Thus an ample oil capacity may be fed to the bushing 6 and fresh and cool oil may be continuously picked up and wedged into the bearing by the rotating countershaft over the entire bearing length. The plurality of additional radial grooves 13, 14, and 15 assure an ample supply of lubrication to the inner oil slinger ring face which acts as a thrust bearing against the outer face of the flange 10 on the bushing 6. The oil slinger ring is keyed to the shaft for rotation therewith and is located by the safety set collar or ring 70 of Figure 1 or by the hub of a pulley, such as that illustrated at 160 in Figure 6.

I provide means for insuring the simple and correct assembly of my lubricating and sealing means. The oil slinger ring 20 is fitted with a light push fit in assembly. Since oil is fed under pressure, it is anticipated that oil will leak through the oil slinger ring fit and especially through the keyway tracks between the key 25 and the longitudinal surface of the groove 27. Such oil leakage will be caught in the circumferential oil collection groove 41 in the oil slinger ring and will be discarded therefrom through the passage 42 under the influence of the centrifugal action of the shaft and slinger ring. The oil thus discarded is directed against the outwardly tapered or inclined inner face of the oil flinger portion 32. The centrifugal action of the oil flinger portion causes this oil to be thrown outwardly into the housing 52 from whence it drains downwardly through the drain chamber to drain 60 from whence it is returned to the oil pump suction line. Some of the oil escaping from the inner surface of the flinger portion 30 will be caught in the upper portion of the circumferential trough or groove 59 from whence it will drain downwardly to the drain chamber 60. Some of the oil caught in the groove or trough 59 may drain from the bottom surface thereof onto the tapered inner face of the flinger portion 30 from whence it will, due to the centrifugal action of the flinger portion, again be thrown against the housing 52 and will flow by gravity into the drain chamber 60.

The oil passing outwardly through the radial groove 12 is similarly agitated within the housing 52 by the outer conical surface of the flinger portion 32. While the oil escaping from the groove 12 may be repeatedly thrown against the housing 52 and back against the outer surface of the flinger portion 32, it will eventually enter the drain chamber 60 and drain therefrom to the oil pump suction line, thus insuring a continuous flow of cool oil through the bushing 6. Thus a continuous flow of oil through the bushing 6 and outwardly from the radial groove 12 or through the keyway 27, groove 40 and passage 42, is insured.

The countershaft bushings are safeguarded against dust intrusion by means of an expanding type piston ring 46 located in a groove 45 in the outer circumferential face of the flinger ring 20. The ring 46 presses and seals against the bore of the flinger ring seal housing 52. Thus the ring 46 seals the housing 52 against the escape of oil therefrom and also against the entry of dust thereinto. It should be understood that the structures with which the present invention may be associated may be operated in an area of substantial dust, such as rock dust, and that the importance of effective sealing, as described, is thus apparent. Because of the pressing and expanding action of the piston ring 46 against the bore 55 of the housing 52, the piston ring will not rotate with the flinger ring 20 but will remain stationary and the flinger ring 20 will rotate within the ring 46. A considerable backlash is to be expected between the outer face of the bushing flange 10 and the inner face of the oil flinger portion 30, which coact as a thrust bearing. The piston ring 46 is free, however, to move with the flinger ring 20 within the radial bore 55 of the housing 52 and thus to compensate for such backlash.

Since the housing 52 must be fitted over the flinger ring 20 for attachment as at 51 to the housing flange 50, that is to say, since the assembly operation must be "blind," the outwardly tapered face 58 of the inner portion 57 of the housing 52 is effective to catch and compress the ring 46 as the housing 52 approaches the shaft housing 1.

In the modification shown in Figure 4, the assembly of the bushing within the housing 1 is facilitated by the provision of a substantial slot 90, into which a key of lesser width may be inserted. As the key is of lesser width than the slot, insertion of the bushing, which is normally a press fit, is facilitated since provision is made for some leeway in aligning the key with the slot as the bushing is inserted. If the bushing should turn after insertion, the key would be brought up against one side edge of the slot 90 and would thus locate the bushing within limits set by the recess 90 in the desired position in the shaft housing 1.

In the modification shown in Figure 6, I provide an enlarged circumferential outer surface on the flinger ring portion 30. The enlarged circumferential surface may be toothed to form a gear. A gear 157 may be in mesh with the ring-and-gear combination member 30 and may be turned thereby to drive, for example, an oil pump. A plate 158 in the enlarged flinger ring housing 152 permits assembly and removal of the gear 157 without removal of the flinger ring housing 152. The lubrication system above described may be thus utilized in lubricating not only the countershaft and bushing therefor but also in lubricating the pump gearing 157 and the pump and flinger ring gear train 157—150.

I claim:

1. In a lubricating system for shafts and the like, a shaft housing, means for supplying oil to said shaft housing, a shaft bushing fixed in said housing, a shaft rotatably mounted in said bushing, a longitudinal groove in the wearing surface of said bushing, a radial groove in said bushing in communication with said longitudinal groove, a flinger ring surrounding and mounted for rotation with said shaft at a point adjacent said radial groove to receive oil emanating from said groove, a housing for said flinger ring positioned to receive the oil emanating from said radial groove and said flinger ring, and a central bore in said flinger ring of a diameter substantially equal to that of said shaft and an annular groove in the inner circumferential surface of said flinger ring bore and a passage placing said inner annular groove and said flinger ring housing in communication one with the other at a point within the outer periphery of said flinger ring.

2. The structure of claim 1 wherein said radial groove is positioned to convey oil to an area adjacent an outer surface of said flinger ring and said passage is positioned to convey oil to an area adjacent an inner surface of said flinger ring.

3. In a lubricating system for shafts and the like, a shaft housing, means for conveying oil to a central bore in said shaft housing, a bushing in said bore, a shaft rotatably mounted in said bushing, a longitudinal groove in the inner surface of said bushing adapted to convey oil from the inner end of said bushing to the outer end thereof, an annular outward flange adjacent the outer end of said bushing, a radial groove in said flange of sufficient extension to convey oil from a position adjacent said shaft to a position beyond the perimeter of said flange, and a generally conical flinger ring secured to said shaft for rotation therewith and having an inner face in bearing contact with said flange, the outer conical surface of said flinger ring being positioned to receive the oil emanating from said radial groove, and a housing for said flinger ring and flange.

4. The structure of claim 3 characterized by and including drainage means in the lower portion of said housing.

5. The structure of claim 3 characterized by and including an inwardly extending circumferential ring portion on said housing of less diameter than said flinger ring and extending into said housing a distance sufficient to be surrounded by a portion of said flinger ring.

6. The structure of claim 3 characterized by and including an annular groove in the inner bore of said flinger ring, in position to collect oil passing between said ring and said shaft, and passage means placing said annular groove in communication with an area within said last-named housing.

7. The structure of claim 3 characterized by and including sealing means between said flinger ring housing and said flinger ring.

8. In a lubrication and sealing means for shafts and the like, a shaft housing, means for supplying oil under pressure to an internal bore in said shaft housing, a bushing in said bore, a shaft rotatably mounted in said bushing, a groove in said bushing adapted to convey oil along said shaft, a flinger ring mounted for rotation with said shaft outside said shaft housing, a housing for said flinger ring, a bore in said flinger ring housing in axial alignment with said shaft, said flinger ring having a circumferential portion within said last-named bore, an annular groove in said circumferential flinger ring portion, an expanding sealing ring in said annular groove in contact with the inner surface of said flinger ring housing bore.

9. The structure of claim 8 characterized by and including an inner circumferential extension on said flinger ring housing, said extension having an inner outwardly inclined conical surface in axial alignment with said flinger ring housing bore.

10. The structure of claim 9 characterized by and including an annular groove formed in the outer circumferential surface of said inner extention at least a part of said groove being positioned within said flinger ring.

11. The structure of claim 8 characterized by and including an annular flange on said bushing within said flinger ring housing, a radial groove in said flange extending from the inner bore of said bushing to the outer perimeter of said flange and adapted to convey oil to said flinger ring housing, said flinger ring having an outwardly inclined conical surface, positioned to receive oil from said radial groove and to discard oil therefrom against the inner walls of said flinger ring housing.

12. The structure of claim 11 characterized by and including an annular groove in the inner face of said flinger ring, a passage connecting said groove with the area within said flinger ring housing, and an inner outwardly inclined conical face on said conical flinger ring portion positioned to receive oil from said passage.

13. The structure of claim 11, characterized by and including an annular inner surface on said flinger ring in and bearing contact with the outer face of said bushing flange.

14. In a countershaft structure for crushers and the like, a countershaft housing portion, means for supplying oil to said housing, a bushing in said housing, a longitudinal groove in the inner surface of said bushing of sufficient extension to convey oil throughout the length of said bushing, a flinger ring mounted for rotation with said shaft outside said countershaft housing, a flinger ring housing portion, a radial groove in said bushing within said flinger ring housing and adapted to convey oil outwardly from said bushing into said last-named housing, a gear surface on an outer portion of said flinger ring, a gear member mounted in said flinger ring housing and in mesh with said flinger ring gear, and a shaft for said gear member rotatably mounted for rotation in response to rotation of said flinger ring.

15. In combination, a shaft, a housing surrounding a portion of said shaft and sealing means for said shaft and said housing said shaft having a member mounted for rotation therewith within said housing, including a bore in the outer face of said housing in axial alignment with said shaft, an annular groove in the outer circumferential surface of said member, an expanding piston ring in said groove and in contact with the inner surface of said bore, and an inwardly extending circumferential portion on said housing in axial alignment with said bore, said inward extension having an inwardly directed, outwardly conical surface portion in axial alignment with said bore.

16. In a lubrication system for shafts and the like, a shaft housing, means for supplying oil under pressure to said housing, a bushing in said housing, a shaft rotatably mounted in said bushing, a flinger ring mounted for rotation with said bushing outside said shaft housing, a housing for said flinger ring secured to said shaft housing, an annular flange on said bushing within said flinger ring housing, said flinger ring having an annular portion in bearing contact with the outer face of said flange, a groove surrounding the edge of the bore of said bushing within said flinger ring housing, and a plurality of radial grooves in the outer face of said flange in communication with said groove.

17. The structure of claim 16 wherein said flange is keyed to said shaft housing against relative rotation therewith.

(References on following page)

References Cited in the file of this patent

UNITED STATES PATENTS

| | | |
|---|---|---|
| 884,477 | Emmet et al. | Apr. 14, 1908 |
| 1,215,374 | Holmgren | Feb. 13, 1917 |
| 1,562,642 | Holmstrom | Nov. 24, 1925 |
| 1,788,992 | Ecabert | Jan. 13, 1931 |
| 2,008,581 | Dennison et al. | July 16, 1935 |
| 2,161,768 | Smitmans | June 6, 1939 |

FOREIGN PATENTS

| | | |
|---|---|---|
| 690,334 | Germany | Apr. 23, 1940 |